United States Patent
Takada et al.

(10) Patent No.: US 6,849,115 B2
(45) Date of Patent: Feb. 1, 2005

(54) METHOD OF MANUFACTURING ALUMINUM-SUBSTITUTED HEMATITE

(75) Inventors: Jun Takada, Okayama (JP); Tatsuo Fujii, Okayama (JP); Makoto Nakanishi, Okayama (JP)

(73) Assignee: President of Okayama University, Okayama (JP)

(*) Notice: Subject to any disclaimer, the term of this patent is extended or adjusted under 35 U.S.C. 154(b) by 0 days.

(21) Appl. No.: 10/610,564

(22) Filed: Jul. 2, 2003

(65) Prior Publication Data

US 2004/0007160 A1 Jan. 15, 2004

(30) Foreign Application Priority Data

Jul. 9, 2002 (JP) .................................... 2002-199947

(51) Int. Cl.[7] ................................................ C09C 1/22
(52) U.S. Cl. ....................... 106/456; 106/418; 106/459; 106/442; 501/127; 427/419.3
(58) Field of Search ................................ 106/418, 456, 106/442, 459; 501/127; 427/419.3

(56) References Cited

U.S. PATENT DOCUMENTS 4,373,963 A * 2/1983 Uenishi et al. ............. 106/415
5,500,043 A * 3/1996 Harada et al. ............. 106/456
5,522,923 A * 6/1996 Kimura et al. ............. 106/418

OTHER PUBLICATIONS

A. Violante, et al., "Nature of mixed iron and aluminum gels as affected by Fe/Al molar ratio, pH and citrate," Journal of the European Clay Groups, vol. 33, 1998, pp. 511–519.

U. Schwertmann, et al., "The effect of Al on Fe oxides. XIX. Formation of Al–substituted hematite from ferrihydrite," Clays and Clay Minerals, vol. 48, No. 2, 2000, pp. 159–172.

* cited by examiner

Primary Examiner—Mark L. Bell
Assistant Examiner—Shalie Manlove
(74) Attorney, Agent, or Firm—Oblon, Spivak, McClelland, Maier & Neustadt, P.C.

(57) ABSTRACT

A method of manufacturing aluminum-substituted hematite represented by $\alpha\text{-}(Fe_{1-x}Al_x)_2O_3$ where $x=0.01$ to $0.15$, by mixing an iron compound and an aluminum compound such that an atomic ratio of Fe to Al falls within the range of 99:1 to 85:15, adding citric acid and ethylene glycol to the mixture of the iron compound and aluminum compound to produce a gel, and pyrolyzing the gel, followed by calcining the pyrolyzed product.

2 Claims, 4 Drawing Sheets

METHOD OF MANUFACTURING ALUMINUM-SUBSTITUTED HEMATITE

CROSS-REFERENCE TO RELATED APPLICATIONS

This application is based upon and claims the benefit of priority from the prior Japanese Patent Application No. 2002-199947, filed July 9, 2002, the entire contents of which are incorporated herein by reference.

BACKGROUND OF THE INVENTION

1. Field of the Invention

The present invention relates to a method of manufacturing aluminum-substituted hematite to be used as a red pigment for ceramics, lacquer wares, tiles, bricks, roofing tiles, coating materials, and paints.

2. Description of the Related Art

In the past, "Fukiya Bengara" containing iron oxide as a main component, which means refinery red iron oxide, was used as a high-quality red pigment for ceramics. The refinery red iron oxide was manufactured until the middle of the 1960s but is not manufactured today. However, there has been a strong demand for a bright red pigment such as the refinery red iron oxide.

Conventional artificial red iron oxide, which is synthesized by a solid-phase reaction, is directed to high-purity hematite ($\alpha$-$Fe_2O_3$). The high purity hematite synthesized through the solid-phase reaction is stable at temperatures of 650° C. or lower but exhibits a dull color at temperatures of 700° C. or higher. It has been proved that the dull color is attributed to growth of hematite grains. Accordingly, the high-purity hematite cannot be used as a pigment under the conditions that high temperature heating is performed.

BRIEF SUMMARY OF THE INVENTION

An object of the present invention is to provide a method of manufacturing aluminum-substituted hematite that shows stably a bright color even when it is heated to high temperatures.

According to an aspect of the present invention, there is provided a method of manufacturing aluminum-substituted hematite comprising: mixing an iron compound and an aluminum compound such that an atomic ratio of Fe to Al falls within a range of 99:1 to 85:15; adding citric acid and ethylene glycol to the mixture of the iron compound and aluminum compound to produce a gel by a polymerized complex method; and pyrolyzing the gel, followed by calcining the pyrolyzed product to produce the aluminum-substituted hematite.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below.

Figure 1:
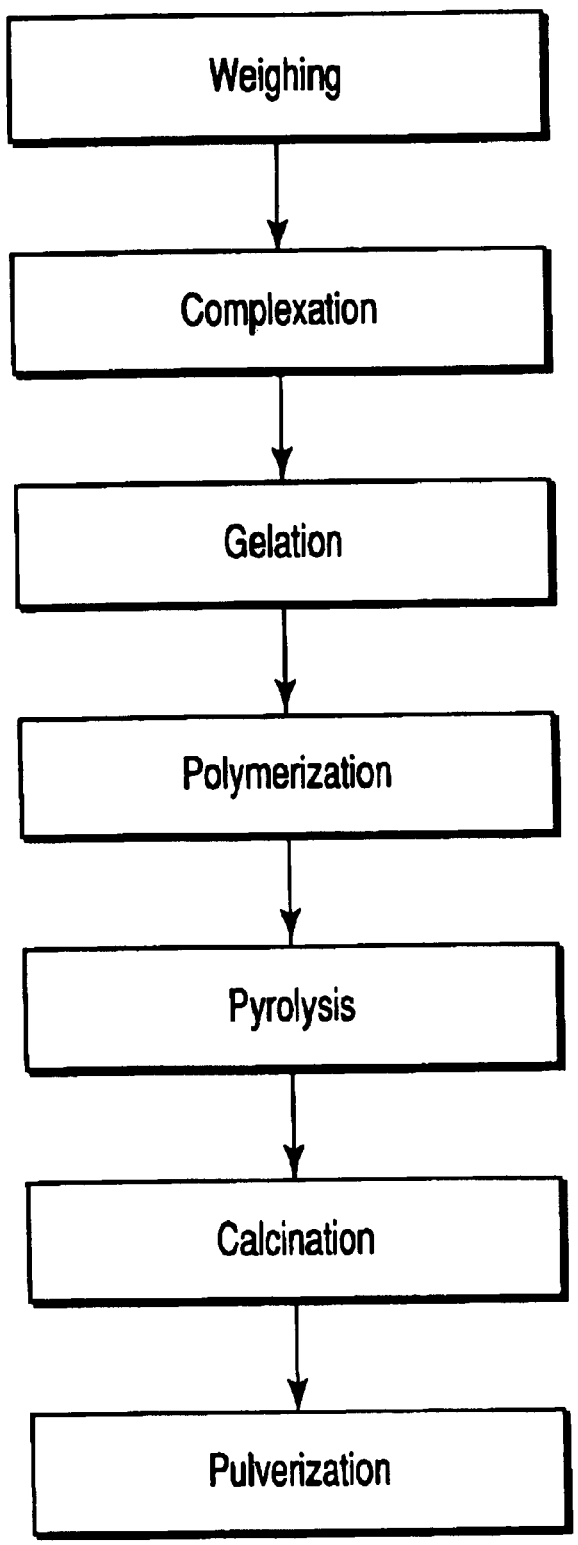
FIG. 1 is a flowchart showing a manufacturing process for aluminum-substituted hematite by a polymerized complex method employed in examples of the present invention.

FIG. 1 is a flowchart showing the process for manufacturing aluminum-substituted hematite by a polymerized complex method according to the present invention. As shown in FIG. 1, an iron compound and an aluminum compound, which are used as starting materials, are weighed. Citric acid and ethylene glycol are added to the resultant mixture to produce a complex, which is then gelled and polymerized. The resultant gel is pyrolyzed and then calcined to produce aluminum-substituted hematite. The resultant aluminum-substituted hematite is pulverized and used as a pigment.

The iron compound to be used in the present invention includes (a) iron (II) acetate; iron (II) bromide and a hydrate thereof; iron (III) bromide; iron (II) chloride and a hydrate thereof; iron (III) chloride and a hydrate thereof; iron (III) citrate and a hydrate thereof; iron (II) lactate and a hydrate thereof; iron (III) nitrate and a hydrate thereof; iron (II) perchlorate and a hydrate thereof; iron (II) sulfate and a hydrate thereof; iron (III) sulfate and a hydrate thereof; ammonium iron (III) citrate; ammonium iron (II) sulfate and a hydrate thereof; and ammonium iron (III) sulfate and a hydrate thereof; as well as (a') iron (II) oxalate dihydrate; iron (II) phosphate and a hydrate thereof; iron (III) phosphate and a hydrate thereof; iron oxide; iron (II) fluoride and a hydrate thereof; and ammonium iron (III) oxalate and a hydrate thereof.

The aluminum compound to be used in the present invention includes (b) aluminum acetate and a hydrate thereof; ammonium aluminum sulfate and a hydrate thereof; aluminum bromide; aluminum lactate; aluminum nitrate and a hydrate thereof; aluminum perchlorate and a hydrate thereof; aluminum sulfate and a hydrate thereof; aluminum oxalate and a hydrate thereof; and aluminum dihydrogenphosphate.

When an iron compound (a) and an aluminum compound (b) are used, citric acid, ethylene glycol, and water are added to these compounds and the resultant mixture is subjected to the polymerized complex method. When an iron compound (a') and an aluminum compound (b) are used, they are dissolved in an acid such as nitric acid, hydrochloric acid, or acetic acid, and thereafter citric acid and ethylene glycol are added to the solution, and the resultant mixture is subjected to the polymerized complex method.

The amount of citric acid is preferably 1 to 10 times that of the starting materials (the total amount of an iron compound and an aluminum compound) by molar ratio. The amount of ethylene glycol is preferably 5 to 30 times that of the starting materials by molar ratio. When water is used, the amount of water is preferably 5 to 70 times that of the starting materials.

In the polymerized complex method, a chelate complex is formed of citric acid and a metal salt. The chelate complex is reacted with ethylene glycol to cause dehydration and condensation (esterification) thereby producing a polymerized complex (gel). The polymerized complex method is performed at temperatures of 100 to 190° C. for 0.5 to 24 hours. This method makes it possible to form a three-dimensional network having metal ions (Fe ions and Al ions) uniformly dispersed therein.

Pyrolysis of the gel is performed at temperatures of 200° C. to 500° C. for 0.5 to 12 hours. Calcination of the pyrolyzed product is performed at temperatures of 350° C. to 1100° C., more preferably, 700° C. to 1100° C. for 0.5 to 12 hours.

As mentioned above, the polymerized complex method makes it possible to synthesize aluminum-substituted hematite represented by $\alpha\text{-}(Fe_{1-x}Al_x)_2O_3$ where x=0.01 to 0.15, which is a compound formed by substituting Al for Fe in hematite ($\alpha\text{-}(Fe_2O_3)$) in a concentration as high as 1 to 15 at %. The Al substitution for Fe in hematite ($\alpha\text{-}(Fe_2O_3)$) is preferably 2 to 15 at % and more preferably 5 to 15 at %.

In the aluminum-substituted hematite produced by the method of the present invention, grain growth rarely occurs even if it is heated to high temperatures. Thus, the aluminum-substituted hematite stably shows a bright color. In contrast, the high-purity hematite synthesized by a conventional solid-phase reaction, whose Al substitution for Fe is 1 at % or less, has a problem that it exhibits a dull color where it is heated to elevated temperatures of 700° C. or more.

EXAMPLES

Examples of the present invention will be explained below.

As starting materials, $Fe(NO_3)_3 \cdot 9H_2O$ (molecular weight 404.0) and $Al(NO_3)_3 \cdot 6H_2O$ (molecular weight 375.134) were weighed. The molar ratio of Fe to Al is set to be within the range of 100:0 to 70:30. Citric acid (molecular weight 192.12), ethylene glycol (molecular weight 62.07), and water (molecular weight 18.00) were added 5 times, 15 times, and 50 times that of the starting materials by molar ratio, respectively.

For example, in a case where 5 at % aluminum-substituted $\alpha\text{-}(Fe_{0.95}Al_{0.05})_2O_3$ was prepared by using 10 g of the starting materials, the following formulation was employed.

| | |
|---|---|
| $Fe(NO_3)_3 \cdot 9H_2O$ | 9.53406 g (0.0235991 mol) |
| $Al(NO_3)_3 \cdot 6H_2O$ | 0.46594 g (0.0012420 mol) |
| Total | 10 g (0.02484 mol) |
| Citric acid | 23.86371 g (0.1242 mol) |
| Ethylene glycol | 23.12841 g (0.3726 mol) |
| Water | 22.35709 (1.242 mol) |

In another case where 10 at % aluminum-substituted $\alpha\text{-}(Fe_{0.9}Al_{0.1})_2O_3$ was prepared by using 10 g of the starting material, the following formulation was employed.

| | |
|---|---|
| $Fe(NO_3)_3 \cdot 9H_2O$ | 9.06477 g (0.0224375 mol) |
| $Al(NO_3)_3 \cdot 6H_2O$ | 0.93523 g (0.0024930 mol) |
| Total | 10 g (0.02493 mol) |
| Citric acid | 23.94958 g (0.12465 mol) |
| Ethylene glycol | 23.21163 g (0.37395 mol) |
| Water | 22.43754 (1.2465 mol) |

Complexation, gelation, and polymerization were performed to produce a gel. The polymerization was performed in the air at 180° C. for 6 hours. The resultant gel was pyrolyzed in air by heating at 300° C. for 12 hours. The pyrolyzed product was calcined in air at different temperatures between 350° C. and 1100° C. for 2 hours to obtain hematite samples. The resultant hematite samples were pulverized.

The samples of aluminum-substituted hematite, represented by a formula: $\alpha\text{-}(Fe_{1-x}Al_x)_2O_3$ [where x ranges from 0 to 0.15], were subjected to the following evaluation.

Figure 2A:
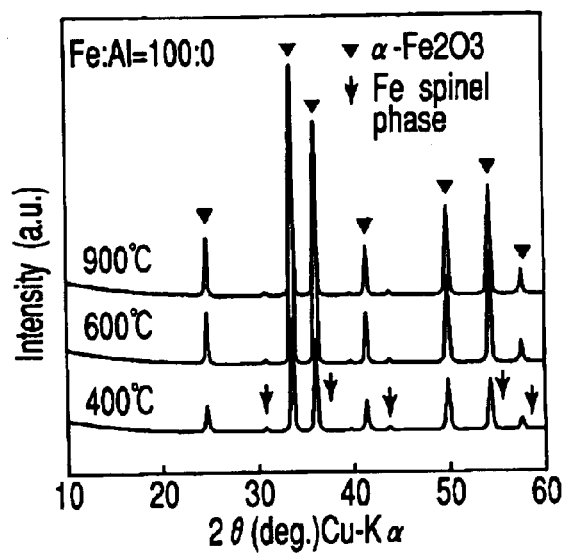
FIGS. 2A to 2C are graphs showing powder X-ray diffraction of aluminum-substituted hematite samples having different aluminum contents when they are heated at various temperatures in Examples of the present invention.
Figure 2B:
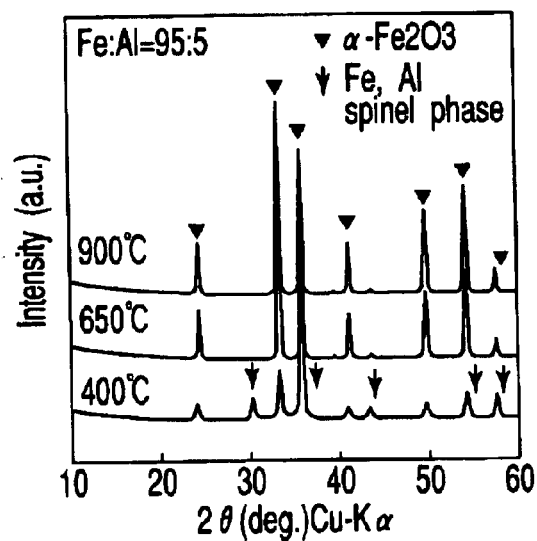
Figure 2C:
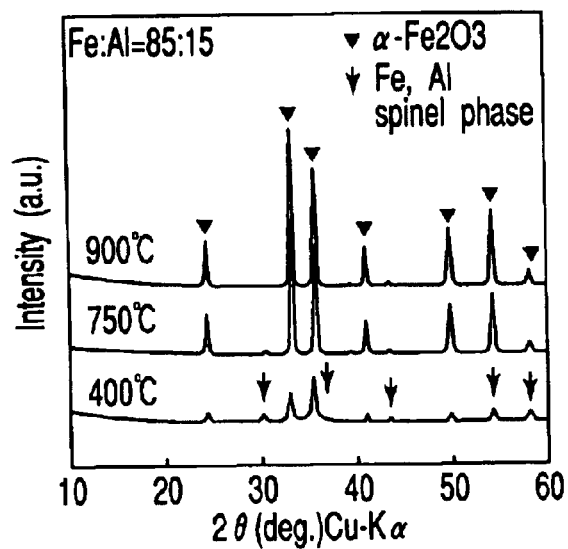

FIGS. 2A to 2C show the results of powder X-ray diffraction with respect to samples having different Al substitution, which were calcined at different temperatures. FIG. 2A shows the diagram for the aluminum-unsubstituted sample (Fe:Al=100:0), FIG. 2B shows the diagram for the 5 at % aluminum-substituted sample (Fe:Al=95:5), and FIG. 2C shows the diagram for the 15 at % aluminum-substituted sample (Fe:Al=85:15). From identification for the generated phases, diffraction peaks, assigned to either a spinel phase of Fe or Fe and Al or a hematite ($\alpha\text{-}Fe_2O_3$) phase, were confirmed.

FIGS. 2A to 2C show the following facts. A spinel phase and a hematite ($\alpha\text{-}Fe_2O_3$) phase coexist in the samples calcined at a low temperature of 400° C., whereas a hematite ($\alpha\text{-}Fe_2O_3$) single phase is observed in the samples calcined at high temperatures of 600° C. or more. It is found that, in the samples containing aluminum up to 15 at %, a hematite single phase is observed. Furthermore, as the Al substitution increases, the calcination temperature by which a hematite single phase is resulted is raised.

Figure 3A:
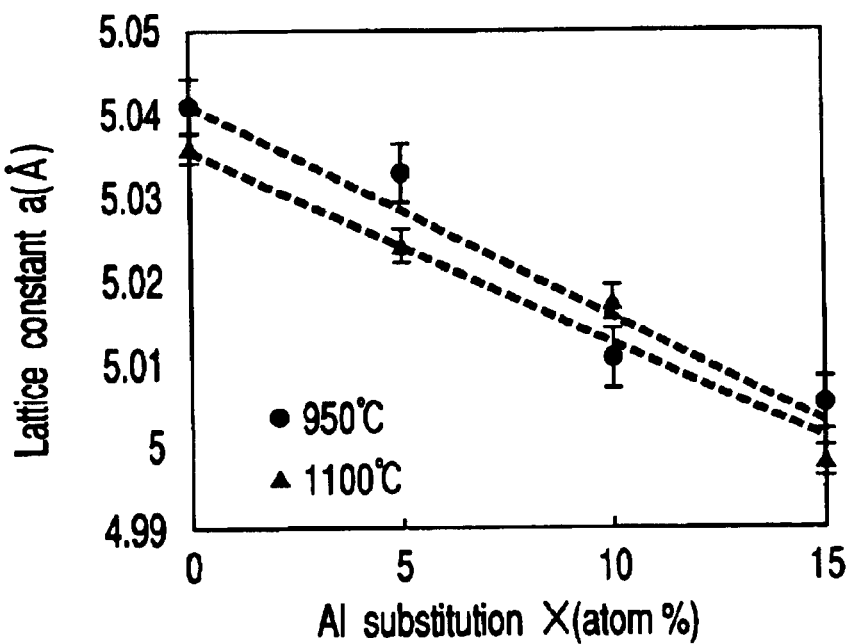
FIGS. 3A and 3B are graphs showing the relationship between the Al substitution x (at %) and the lattice constant of the a-axis or c-axis with respect to the aluminum substituted hematite samples according to Examples of the present invention.
Figure 3B:
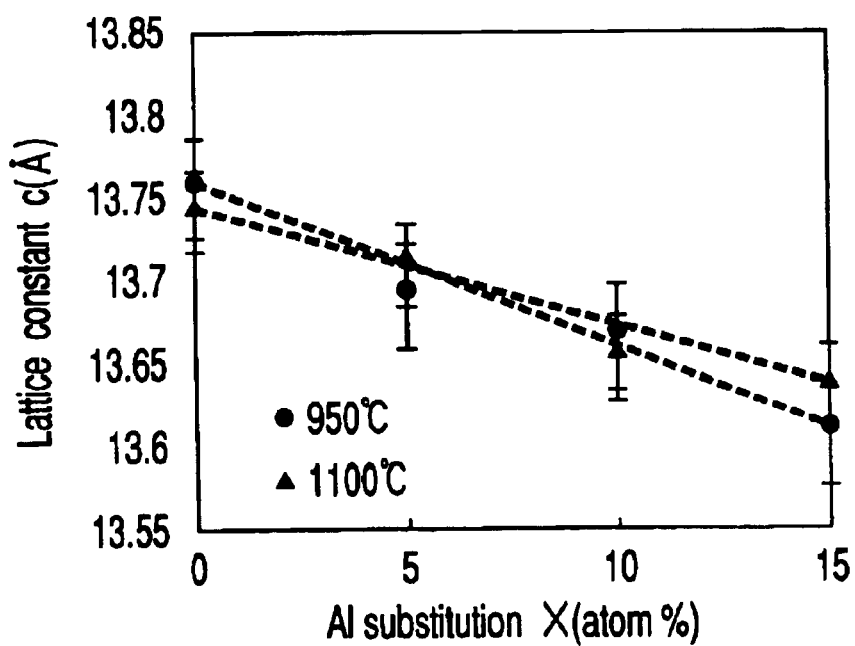

FIGS. 3A and 3B show the relationship between the Al substitution x (at %) and the lattice constant of the a-axis or c-axis. These measurements were performed with respect to the samples heated at 950° C. or 1100° C.

FIGS. 3A and 3B demonstrate that the lattice constant of each of the a-axis and c-axis decreases with the Al substitution x. It is judged that this tendency is attributed to solution of Al into $\alpha\text{-}Fe_2O_3$.

Figure 4A:
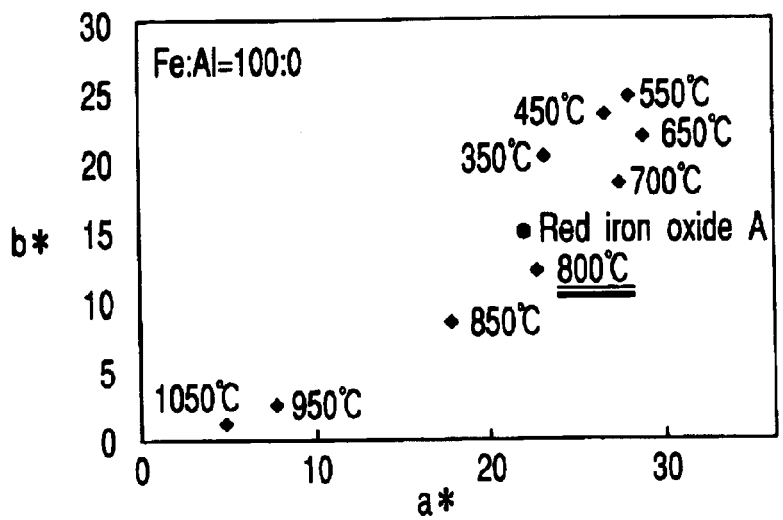
FIGS. 4A to 4C are chromaticity diagrams for the aluminum-substituted hematite samples having different aluminum contents when they are heated at various temperatures in Examples of the present invention.
Figure 4B:
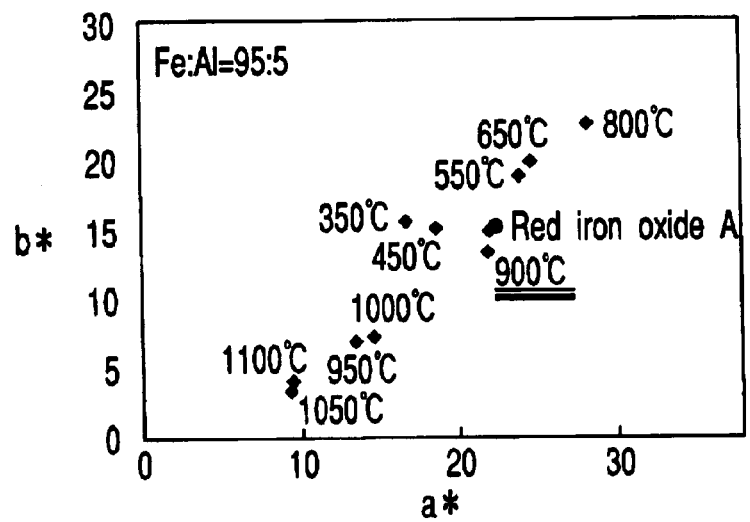
Figure 4C:
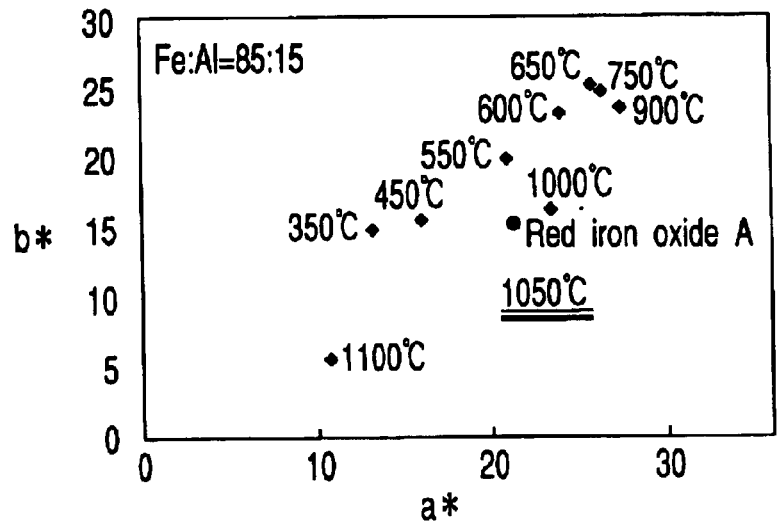

Samples having different Al substitution were heated at different temperatures and checked for color. FIGS. 4A to 4C show chromaticity (hue and chroma) of each sample according to the L*a*b* color space in the a*b* coordinates. The value of +a* indicates the direction toward red, the value of −a* indicates the direction toward green, the value of +b* indicates the direction toward yellow, and the value of −b* indicates the direction toward blue. For the reference, the chromaticity of an extant "Fukiya Bengara" (indicated by "red iron oxide A") is plotted in each graph. FIG. 4A shows the graph for the aluminum-unsubstituted sample (Fe:Al=100:0), FIG. 4B shows the graph for the 5 at % aluminum-substituted sample (Fe:Al=95:5) and FIG. 4C shows the graph for the 15 at % aluminum-substituted sample (Fe:Al=85:15).

As shown in FIGS. 4A to 4C, the 5 at % aluminum-substituted sample calcined at 900° C. and the 15 at % aluminum-substituted sample calcined at 1050° C. indicate substantially the same chromaticity as the extant Bengara. This demonstrates that the aluminum-substituted hematite having a high aluminum substitution is substantially free from growth of hematite grains even if it is heated to elevated temperatures ranging from 700° C. to 1100° C., with the result that the resultant hematite stably exhibits a bright color.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing aluminum-substituted hematite comprising:

mixing an iron compound and an aluminum compound such that an atomic ratio of Fe to Al falls within a range of 99:1 to 85:15;

adding citric acid and ethylene glycol to the mixture of the iron compound and aluminum compound to produce a gel; and pyrolyzing the gel, followed by calcining the pyrolyzed product to produce the aluminum-substituted hematite.

2. The method according to claim 1, wherein the pyrolyzed product is calcined at temperatures ranging from 700° C. to 1100° C.

* * * * *